(12) United States Patent
Nomura et al.

(10) Patent No.: US 8,558,936 B2
(45) Date of Patent: Oct. 15, 2013

(54) IMAGING APPARATUS

(75) Inventors: Yuji Nomura, Osaka (JP); Satoko Nishizaki, Nara (JP); Tetsuya Satou, Osaka (JP); Taizo Aoki, Hyogo (JP)

(73) Assignee: Panasonic Corporation, Osaka (JP)

( * ) Notice: Subject to any disclaimer, the term of this patent is extended or adjusted under 35 U.S.C. 154(b) by 379 days.

(21) Appl. No.: 12/868,843

(22) Filed: Aug. 26, 2010

(65) Prior Publication Data

US 2011/0050923 A1    Mar. 3, 2011

(30) Foreign Application Priority Data

Aug. 28, 2009  (JP) ................................ 2009-197822

(51) Int. Cl.
*H04N 5/222*  (2006.01)
(52) U.S. Cl.
USPC ................. 348/333.02; 348/333.04; 348/362; 348/364; 396/287; 396/290
(58) Field of Classification Search
USPC .......... 348/333.02, 362, 208.99, 364, 333.04; 396/287, 290, 374
See application file for complete search history.

(56) References Cited

U.S. PATENT DOCUMENTS

| | | | |
|---|---|---|---|
| 4,748,468 A | 5/1988 | Fujino et al. | |
| 5,274,408 A | 12/1993 | Fujisawa et al. | |
| 2004/0042791 A1 | 3/2004 | Suekane et al. | |
| 2007/0003269 A1 | 1/2007 | Ueda et al. | |
| 2010/0066858 A1* | 3/2010 | Asoma | 348/229.1 |

FOREIGN PATENT DOCUMENTS

| | | |
|---|---|---|
| JP | 6-202191 | 7/1994 |
| JP | 7-019025 | 3/1995 |
| JP | 7-159877 | 6/1995 |
| JP | 2003-322902 | 11/2003 |
| JP | 2007-041540 | 2/2007 |

\* cited by examiner

*Primary Examiner* — Sinh Tran
*Assistant Examiner* — Paul Berardesca
(74) *Attorney, Agent, or Firm* — Panasonic Patent Center

(57) ABSTRACT

An imaging apparatus includes an imaging unit operable to capture a subject image to generate image data, a controller operable to calculate a target exposure value based on the image data and control exposure based on a first shooting parameter set by a user to obtain the target exposure value, and a display unit operable to provide a display. The controller calculates a first suitable range which is a range of the first shooting parameter for obtaining the target exposure value, and calculates a second shooting parameter based on the target exposure value and the first shooting parameter set by the user. The display unit displays exposure guide information including the first shooting parameter set by the user, information representing the first suitable range, and the calculated second shooting parameter.

11 Claims, 11 Drawing Sheets

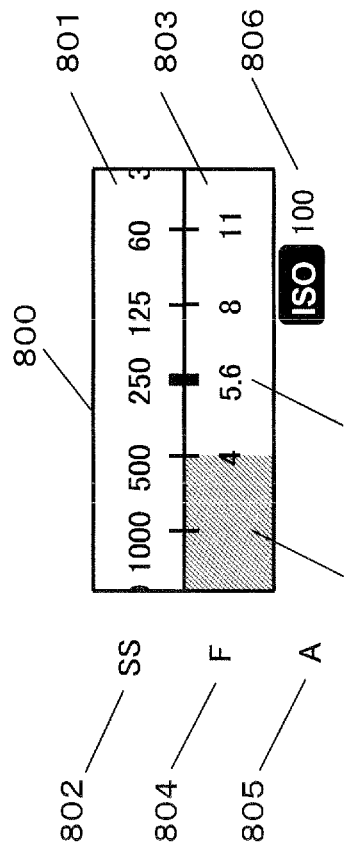
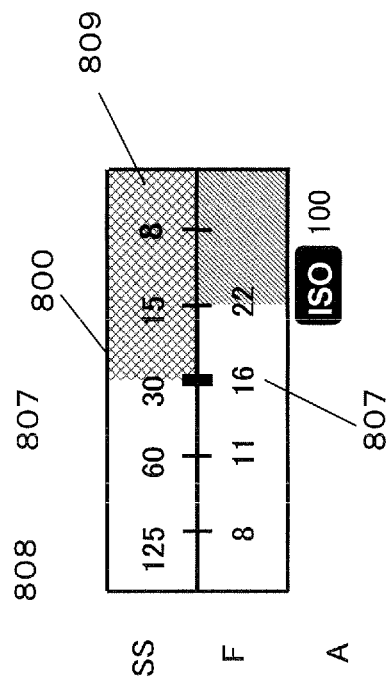
Fig. 10A
Fig. 10B

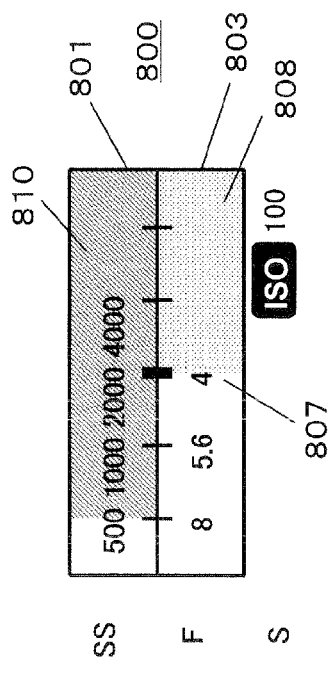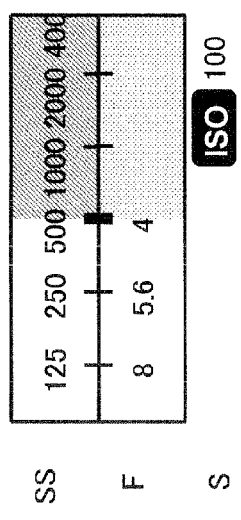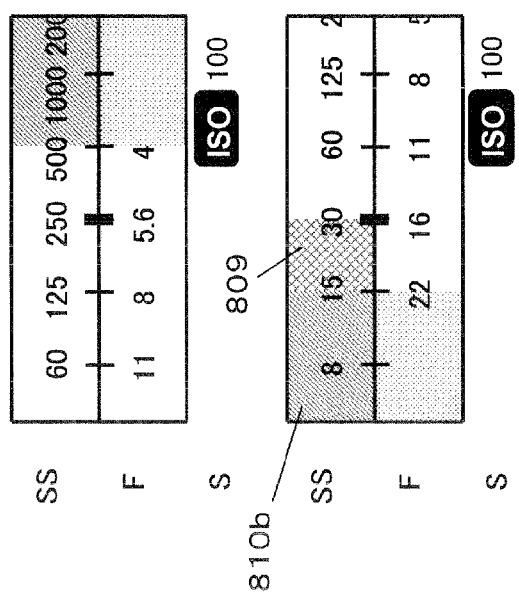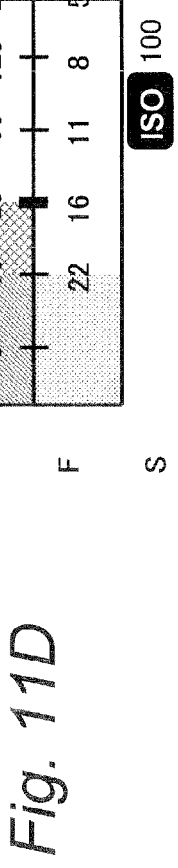
Fig. 11A
Fig. 11B
Fig. 11C
Fig. 11D

IMAGING APPARATUS

BACKGROUND

1. Technical Field

The technical field relates to an imaging apparatus that captures and outputs a subject. The invention particularly relates to the imaging apparatus capable of displaying a guide for user's suitable setting of exposure.

2. Related Art

Conventionally, there are imaging apparatuses in which a user can manually set either one of two exposure conditions including an aperture and a shutter speed in accordance with user's preference and the other exposure condition can be automatically set based on the one exposure condition set by the user so as to obtain suitable exposure setting. Some of such imaging apparatuses can display an exposure state (for example, see JP 07-333706 A), so that a user can check the set exposure state.

According to the conventional imaging apparatus, when the user sets either one of an aperture and shutter speed, the other is determined by the imaging apparatus, the exposure may be occasionally out of a suitable exposure range depending on users' set exposure values and conditions of subjects. In such a case, it is difficult for a user to understand how much the settings should be changed for obtaining the suitable exposure settings.

For example, it is assumed that in an aperture priority mode, a user sets an aperture value to F2. At this time, when brightness of a subject is too large, even if a shutter speed is set to a highest value which can be set by the conventional imaging apparatus, overexposure occurs. At that time, a general user hardly is able to quickly recognize how much the aperture is narrowed for obtaining suitable exposure setting, so that the user may miss a chance to take a good picture.

SUMMARY

To solve the above problem, an imaging apparatus capable of displaying an exposure guide for enabling users to easily recognize suitable exposure settings.

In one aspect, an imaging apparatus is provided, including an imaging unit operable to capture a subject image to generate image data, a controller operable to calculate a target exposure value based on the image data and control exposure based on a first shooting parameter set by a user to obtain the target exposure value, and a display unit operable to provide a display. The controller calculates a first suitable range which is a range of the first shooting parameter for obtaining the target exposure value, and calculates a second shooting parameter based on the target exposure value and the first shooting parameter set by the user. The display unit displays exposure guide information including the first shooting parameter set by the user, information representing the first suitable range, and the calculated second shooting parameter.

According to the imaging apparatus of the above aspect, the exposure guide information is displayed, which indicates setting states of parameters for determining exposure, such as an aperture value and a shutter speed, together with a range of combination of the parameters for obtaining suitable exposure. As a result, even when a user sets a parameter with which a suitable exposure is not obtained, the user can easily recognize a value for obtaining the suitable exposure according to the exposure guide information. Therefore, the user can quickly set the suitable exposure based on the exposure guide information.

BRIEF DESCRIPTION OF DRAWINGS

FIGS. 10A and 10B are diagrams illustrating display examples of the exposure guide in A mode (with Ev=13).

FIGS. 11A to 11D are diagrams illustrating display examples of the exposure guide in S mode (with Ev=13).

DETAILED DESCRIPTION OF PREFERRED EMBODIMENTS

Preferred embodiments are described below with reference to the accompanying drawings.

I. First Embodiment

A digital camera according to the embodiment described below displays, as reference information for a user's determination of an aperture value and a shutter speed, setting states of parameters together with a range of combination of the parameters for obtaining suitable exposure on a display section. As a result, the user can recognize a combination of the parameters for obtaining the suitable exposure in one view. Further, even when the suitable exposure cannot be obtained with the current settings, the user can instantaneously recognize how much the settings should be changed for obtaining the suitable exposure. A configuration and an operation of the digital camera according to the first embodiment are described in detail below.

1. CONFIGURATION OF DIGITAL CAMERA

Figure 1:
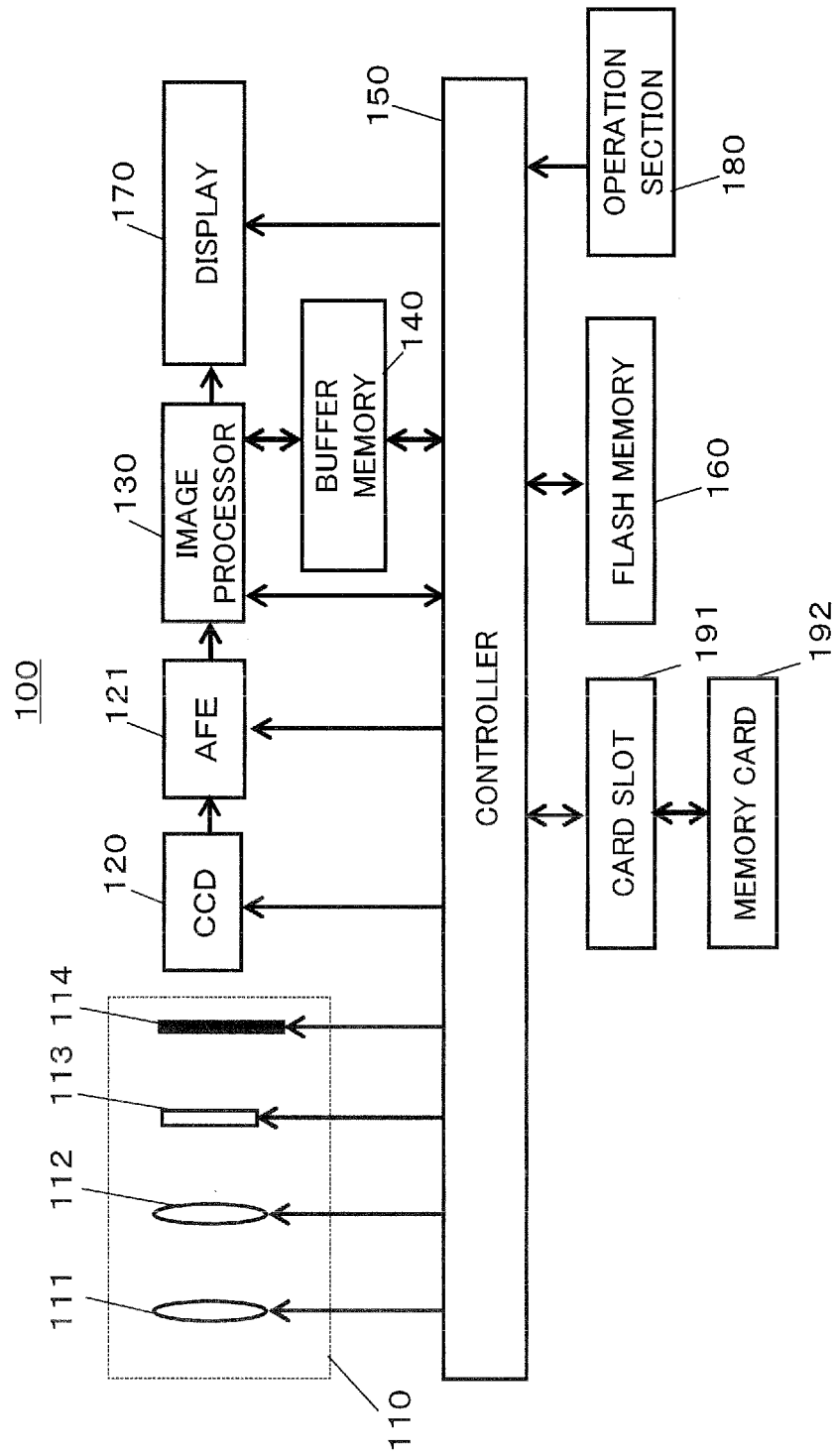
FIG. 1 is a block diagram illustrating a configuration of a digital camera.

FIG. 1 is a block diagram illustrating a configuration of the digital camera. The digital camera 100 captures a subject image formed via an optical system 110 using a CCD image sensor 120. The CCD image sensor 120 generates image data based on the captured subject image. The image data captured and generated is subject to various image processes in an analog front end (AFE) 121 and an image processor 130. The image data subject to the image processes is recorded in a flash memory 160 or a memory card 192. When an operation section 180 receives a user's operation for instructing playback, the image data recorded in the flash memory 160 or the memory card 192 is reproduced to be displayed on a display section 170 such as an LCD (Liquid Crystal Device).

The optical system 110 includes a focus lens 111, a zoom lens 112, a diaphragm 113 and a shutter 114. The optical system 110 may include a lens for an optical image stabilizer (OIS). The optical system 110 may include any number of various lenses or any number of lens groups.

The focus lens 111 is used for adjusting a focal distance. The zoom lens 112 is used for adjusting a zoom-in/zoom-out magnification. The diaphragm 113 is used for adjusting a quantity of light incident on the CCD image sensor. A range of an aperture value which can be set to the diaphragm 113 is F4 to F22. The shutter 114 adjusts exposure time of the light incident on the CCD image sensor 120. A range of shutter speed which can be se to the shutter 114 is 60 to 1/4000 seconds. The focus lens 111, the zoom lens 112, the diaphragm 113 and the shutter 114 are driven by the respective driver (not shown) such as a DC motor and a stepping motor according to control signals transmitted from a controller 150.

The CCD image sensor 120 captures a subject image formed via the optical system 110 to generate image data. The CCD image sensor 120 generates image data of new frame every constant time (for example, 1/30 seconds). The CCD image sensor 120 adjusts an exposure amount by means of an operation of an electronic shutter. Instead of the CCD image sensor 120, other imaging devices such as a CMOS image sensor and an NMOS image sensor may be used.

The analog front end 121 executes predetermined processes such as correlated double sampling and gain adjustment on the image data generated by the CCD image sensor 120. In the gain adjustment, a gain corresponding to ISO sensitivity is set. The analog front end 121 converts analog image data into digital image data. Thereafter, the analog front end 121 outputs the image data to the image processor 130.

The processor 130 executes various image processes on the image data. The various image processes include gamma correction, white balance correction, a YC converting process, an electronic zoom process, a compressing process, a decompressing process, but the image processes are not limited to them. Some of these processes may be omitted. The image processor 130 may be made up by a hard-wired electronic circuit, a microcomputer, or the like that executes programs for executing these processes. Further, the image processor 130 may include one integrated circuit as well as the controller 150 or the like.

The operation section 180 includes a button, a lever, a dial and the like provided on an outside of the digital camera 100, and receives a user's operation. For example, a release button, a zoom lever, a mode dial, a command dial, a cross button, a power switch and the like correspond the operation section 180. The operation section 180 also includes a focus ring and a zoom ring provided to a lens barrel, and a touch panel provided to the display section 170. When receiving the user's operation, the operation section 180 transmits an operation instructing signal according to the operation.

The display section 170 is provided on a rear of the digital camera 100. The display section 170 displays an image based on the image data processed by the image processor 130. An image to be displayed on the display section 170 includes a through image and a recorded image. The display section 170 can display, as a through image, images generated every constant time by the CCD image sensor 120 displayed on the display section 170 so as to take a picture while checking a composition of the subject. The recorded image is an image recorded in the memory card 192 or the flash memory 160. The display section 170 displays an image based on the image data recorded in the memory card 192 or the flash memory 160 according to the user's operation. The display section 170 can display a current exposure state determined by the respective shooting parameters together with a range of settable shooting parameters, in addition to the image. The shooting parameters include the aperture value and the shutter speed, and may include the ISO sensitivity, an exposure corrected value, and the like. The display section 170 displays the exposure guide with is superimposed on the through image. The display section 170 can display various setting conditions of the digital camera 100 in addition to the exposure guide.

The controller 150 controls the entire operation of the digital camera 100. The controller 150 includes ROM (not shown) for storing information such as programs, and CPU (not shown) for processing the information such as programs. The ROM stores a program for controlling the entire operation of the digital camera 100 in addition to programs relating to focus control and exposure control. Further, the ROM stores initial shooting data, which is related to the aperture value and the shutter speed and is used for the first recording operation after the CCD image sensor 120 is activated, data relating to a target brightness value for obtaining suitable exposure, and information about a diagram illustrating a relationship among an exposure value (Ev), an aperture value (Av) and a shutter speed (Tv) in an APEX (Additive System of Photographic Exposure) system. In the APEX system, the following formula including brightness of field (Bv) and the ISO sensitivity (Sv) holds:

$$Ev=Av+Tv=Bv+Sy \qquad (1)$$

The controller 150 can control the display section 170 to display a menu. The user can operate the operation section 180 to perform various settings while viewing the menu displayed on the display section 170. The controller 150 acquires information set on the menu by the user.

For example, the controller 150 acquires a recording mode set by the user's operation on the operation section 180. The recording mode includes a P mode (program AE mode), an A mode (aperture priority AE mode), an S mode (shutter speed priority AE mode) and an M mode (manual exposure mode), but may include other recording modes. In the first embodiment, an exposure guide is displayed on the display section in the A mode and the S mode, and the following explanation is made mainly to these two recording modes.

In each recording mode, the shooting parameters are set by the user and/or the controller 150. The shooting parameters to be set by the user are set by the user via the operation section 180. In this case, the controller 150 calculates residual shooting parameters using the parameters set by the user's operation. The controller 150 sets the shooting parameters according to the recording mode. For in the P mode, the controller 150 calculates the aperture value and the shutter speed according to the brightness value of the through image. In the A mode, the controller 150 calculates the shutter speed using the aperture value set by the user and according to the brightness value of the through image. In the S mode, the controller 150 calculates the aperture value according to the shutter speed set by the user and the brightness value of the through image. In the M mode, the user sets all the shooting parameters.

In each mode, the ISO sensitivity is set by the user's operation on the operation section 180. The controller 150 sets a gain in a gain control of the analog front end 121 according to the set ISO sensitivity. In the first embodiment, the ISO sensitivity is set by the user, but the controller 150 may control the ISO sensitivity in the P mode, the A mode and the S mode.

The controller 150 generates image data of the exposure guide based on the set respective shooting parameters and displays the image data on the display section 170.

The controller 150 may be made up by a hard-wired electronic circuit, a microcomputer, or the like. Further, the controller 150 as well as the image processor 130 may be constituted as one integrated circuit. The ROM does not have to be provided in the controller 150, but may be provided outside the controller 150.

A buffer memory 140 is a storage unit that functions as a work memory of the image processor 130 and the controller 150. The buffer memory 140 can be realized by a DRAM (Dynamic Random Access Memory), or the like.

The flash memory 160 functions as an internal memory for recording image data or the like. The controller 150 records image data to be processed by the image processor 130 in the flash memory 160 or the memory card 192.

A card slot 191 is a connecting unit for attaching the memory card 192 to the digital camera 100. The card slot 191 can be electrically or mechanically connected to the memory card 192. The card slot 191 may have a function for controlling the memory card 192.

The memory card 192 is an external memory having therein a memory device such as a flash memory. The memory card 192 can record data such as image data to be processed by the image processor 130. In the first embodiment, the memory card is described as one example of an external memory, but a recording medium such as an optical disk and a HDD may be used as the external memory. Further, a communication interface (wireless or wired) for communicating with a device outside the digital camera 100 may be connected to the controller 150 so that image data is transmitted to the outside device.

1-1. Term Correspondence

The CCD image sensor 120 is one example of an imaging unit. The digital camera 100 is one example of the imaging apparatus. The display section 170 is one example of a display unit. The aperture value and the shutter speed are examples of first and second parameters. An unsuitable exposure area 810 is one example of an unsuitable range. A camera shake area 809 is one example of a camera shake range.

2. OPERATION OF DIGITAL CAMERA

An operation of the digital camera 100 is described below with reference to the drawings.

2-1. Operation Flow

At first, operations for controlling the exposure and displaying the exposure guide in the digital camera 100 are described. The imaging operation when a user selects either one of the A mode and the S mode as the recording mode is described below.

Figure 2:
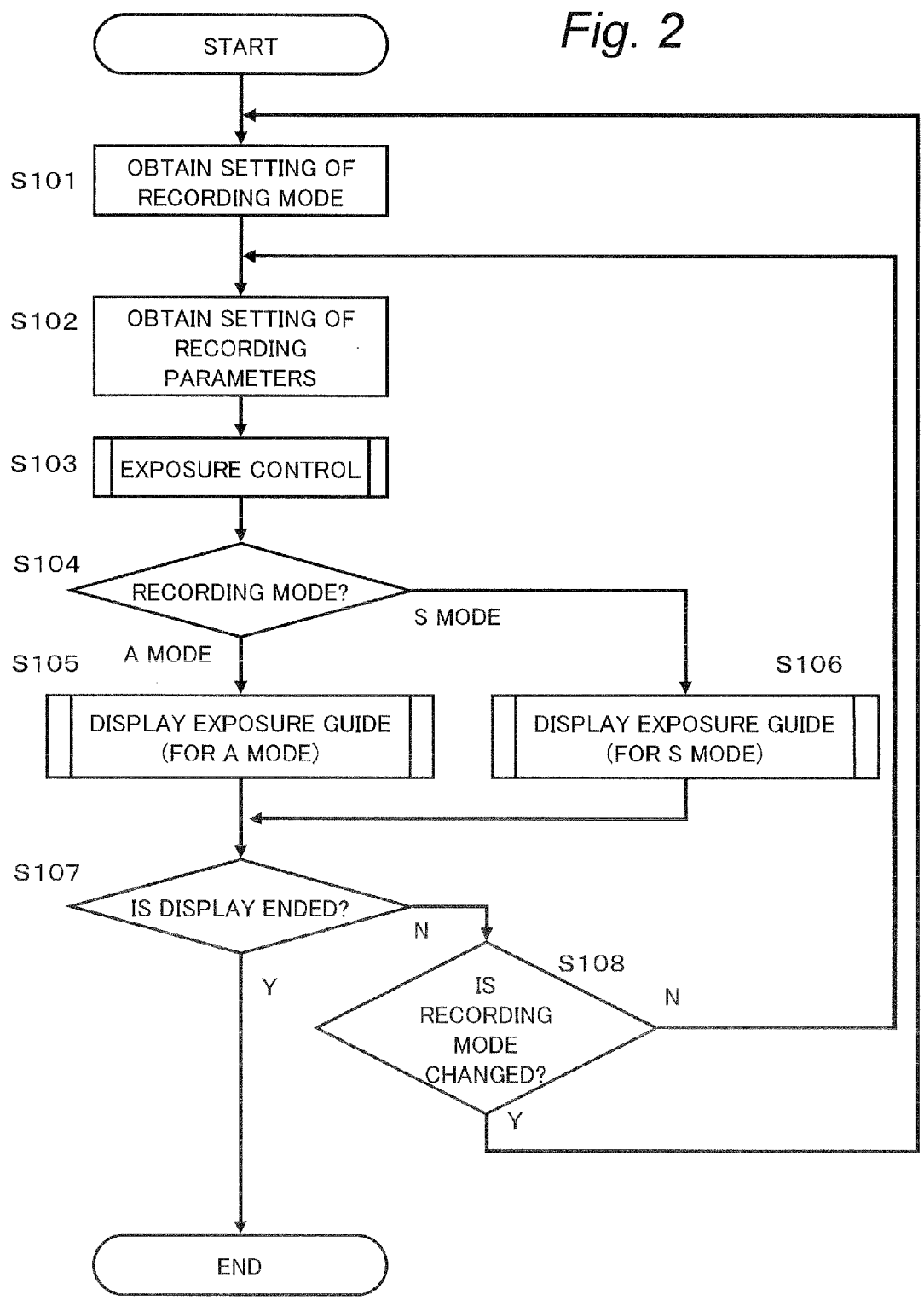
FIG. 2 is a flowchart illustrating an entire operation from exposure control to display of an exposure guide in the digital camera.

FIG. 2 is a flowchart illustrating an entire operation from an exposure control to display of the exposure guide when the recording mode is either one of the A mode and the S mode. Prior to taking a picture, the user operates the operation section 180 to set the recording mode. When the operation section 180 has a mode dial or a button dedicated to the recording mode, the user operates the mode dial or the button. When the operation section 180 does not have the dedicated mode dial or button, the user presses down the menu button of the operation section 180 so as to display the menu, and sets the recording mode on the menu. The controller 150 acquires information indicating the recording mode set by the user (S101).

In an imaging operation, the user turns the digital camera 100 to a subject and operates the operation section 180 according to brightness of the subject to set the shooting parameter such as an aperture value and a shutter speed. Concretely, when the image mode is the A mode (aperture priority AE mode), the user sets the aperture value, and when it is the S mode (shutter speed priority AE mode), the user sets the shutter speed. When the user does not particularly perform an operation, the aperture value and the shutter speed are not changed. The controller 150 acquires information indicating the shooting parameter such as the aperture value or the shutter speed set by the user (S102). Further, the user adjusts a zoom and a focus as needed. The controller 150 suitably controls the optical system 110 according to user's operation.

The controller 150 controls the exposure suitably according to the respective modes (S103). Concretely, in the A mode (aperture priority AE mode), the controller 150 calculates the shutter speed or the like according to the aperture value set by the user and the brightness value of the through image. In the S mode (shutter speed priority AE mode), the controller 150 calculates the aperture value or the like according to the shutter speed set by the user and the brightness value of the through image. Details of this exposure control operation are described later.

Thereafter, the exposure guide is displayed based on the current aperture value and shutter speed. Display contents of the exposure guide vary according to the recording mode. For this reason, the controller 150 determines the recording mode currently set (S104). When the current recording mode is the A mode, an exposure guide for the A mode is displayed (S105). When the recording mode is the S mode, an exposure guide for the S mode is displayed (S106). The exposure guide is indication for showing a range of set value of the aperture value and the shutter speed for obtaining the suitable exposure (see FIG. 9). By referring to the exposure guide, the user can recognize a range of parameter for obtaining the suitable exposure at one view and quickly set the suitable exposure. Details of the exposure guide are described later.

A determination is made whether or not the display of the exposure guide is ended (S107). The end timing includes 1) a timing at which the user presses the release button to start taking a picture, 2) a timing at which the user changes the recording mode into a mode other than the A mode and the S mode, and 3) a timing at which a predetermined time passes after the guide display is started by user's pressing the menu button.

When the determination is made that the display of the exposure guide should be ended ("Y" in S107), the display of the exposure guide is ended (non-display on the display section 170), and the process is ended. On the other hand, when it is determined that the display of the exposure guide should be continued ("N" in S107), the controller 150 determines whether or not the recording mode is changed by the user (S108). When the recording mode is changed ("Y" in S108), the control returns to S101. On the other hand, when the recording mode is not changed ("N" in S108), the control returns to S102. These operations are performed every ⅟30 seconds that is a period at which the CCD image sensor 120 captures a subject image and outputs image data.

Figure 3:
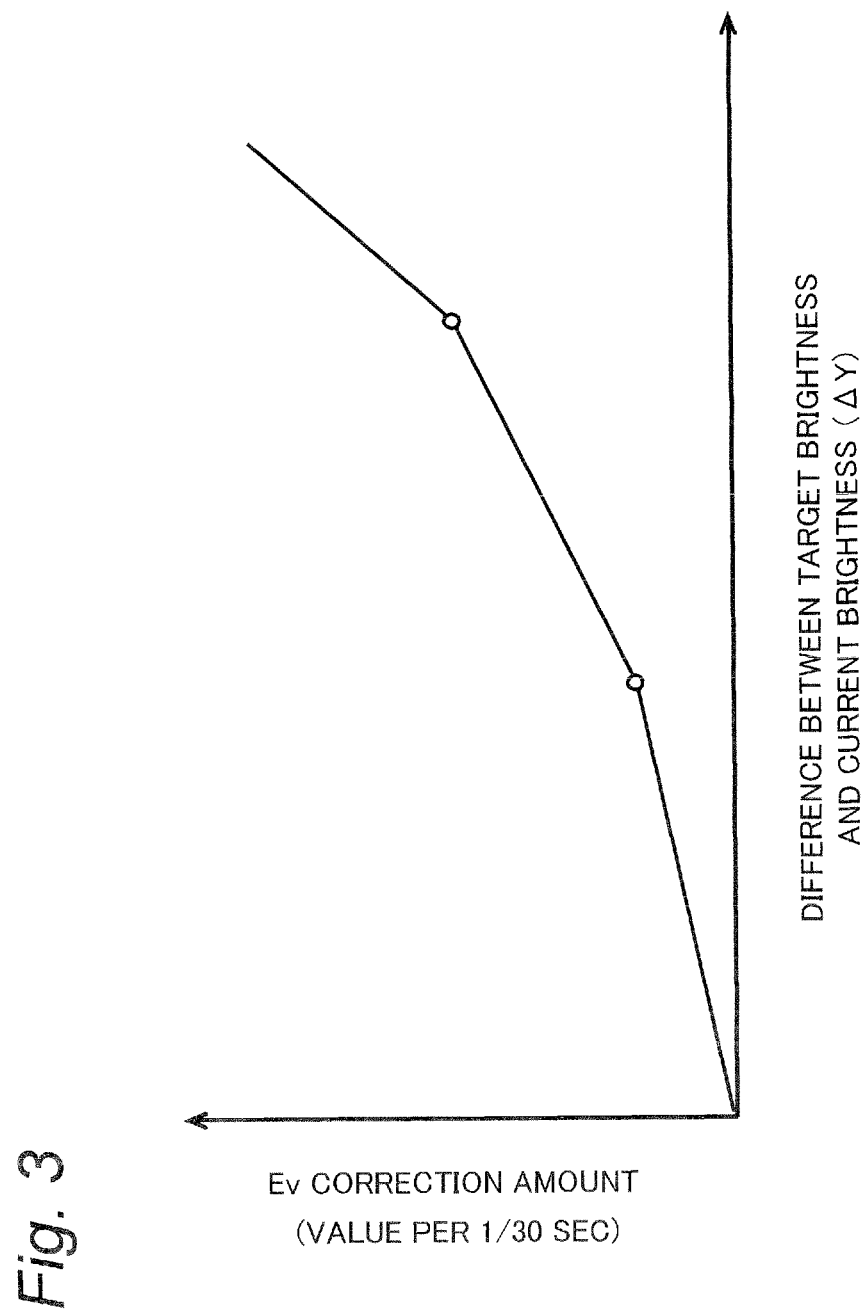
FIG. 3 is an explanatory diagram describing an Ev value correction amount.
Figure 4:
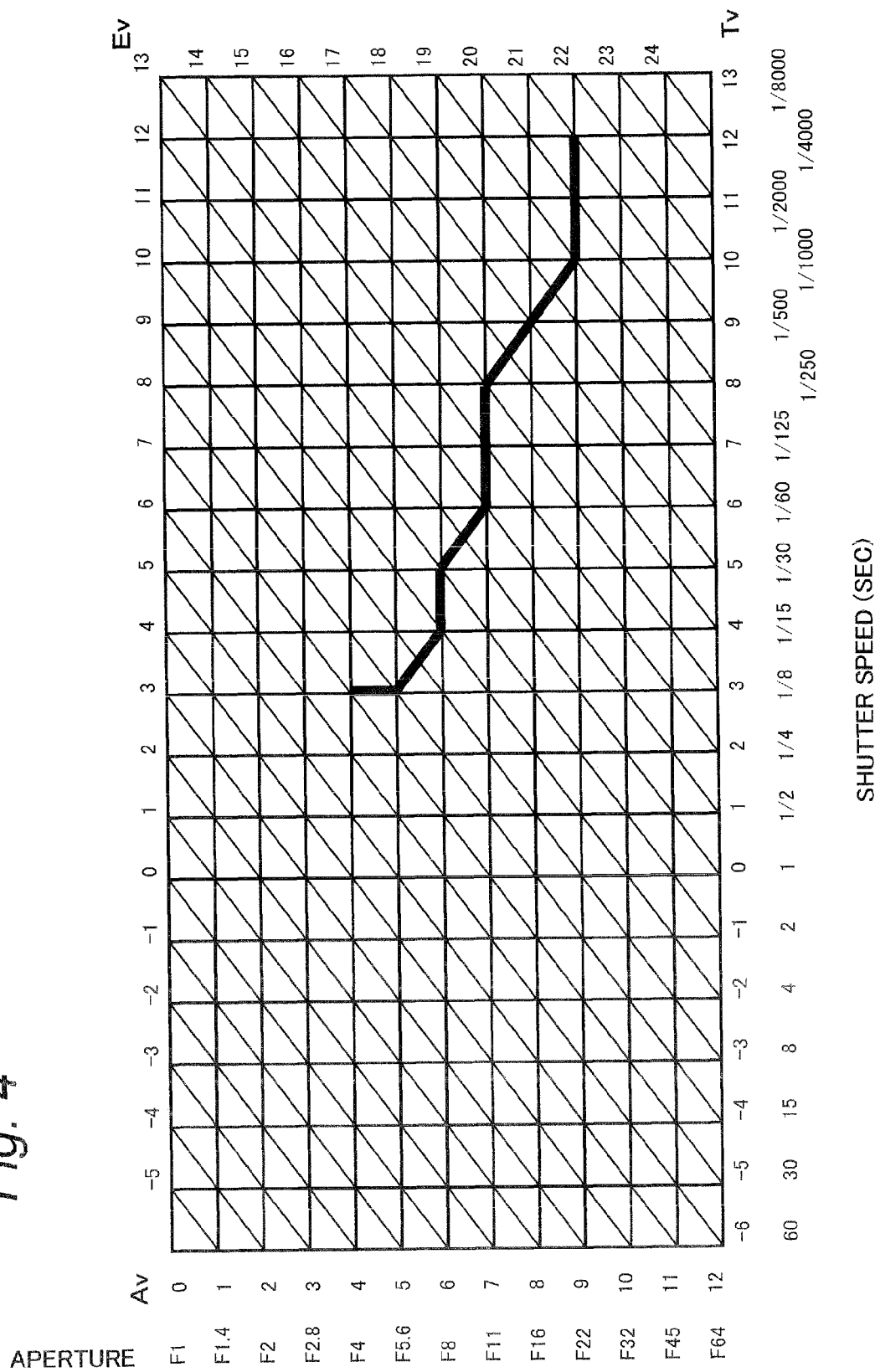
FIG. 4 is a diagram illustrating a relationship among the Ev value, an AV value and a Tv value.

2-2. Exposure Control Operation 2-2-1. Entire Flow of Exposure Control Operation The exposure control operation of the digital camera 100 is described with reference to FIGS. 3, 4 and 5. FIG. 3 is an explanatory diagram describing an Ev correction amount determined with respect to a difference ΔY between a target brightness value and a current brightness value. ΔY is plotted along an abscissa axis, and the Ev correction amount is plotted along an ordinate axis. FIG. 4 is a diagram illustrating a relationship among the Ev value, the Av value and the Tv value in the APEX system. The Tv value is plotted along an abscissa axis, and the Av value is plotted along an ordinate axis. FIG. 4 also illustrates correspondence between the Tv value and an actual shutter speed (second) and correspondence between the Av value and an actual aperture value (F value). Each of diagonally right up lines show the same Ev value, and the Ev value is shown on an upper and right sides of the graph. A thick polygonal line represents a program line in the P mode set in the digital camera 100.

Figure 5:
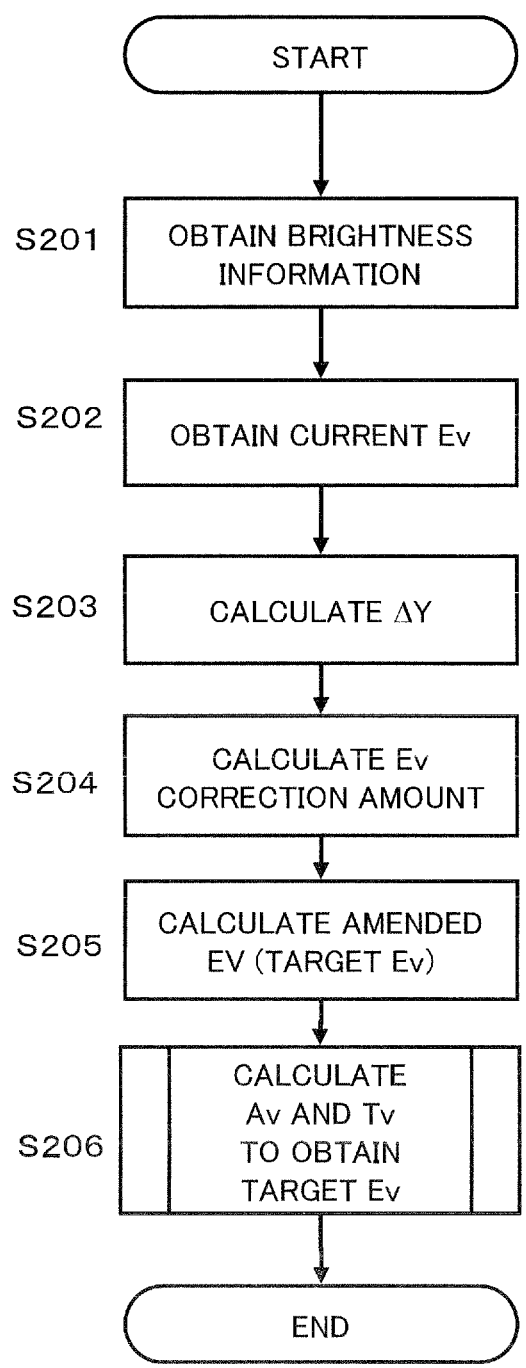
FIG. 5 is a flowchart illustrating an exposure control operation.

FIG. 5 is a flowchart illustrating the exposure control operation. The controller 150 corrects an exposure value every one frame period for which image data is generated, namely, every 1/30 seconds according to the flow chart so that suitable exposure can be obtained. The flow shown in FIG. 5 is described concretely below.

The controller 150 acquires brightness information from image data every time the image data of new frame is generated (S201). A method for calculating the brightness information includes a method for obtaining average brightness of respective pixels in a predetermined range on a center portion of the image as brightness information (spot metering), and a method for dividing the entire image data into a plurality of blocks and weighted-averaging the blocks based on average brightness of the blocks so as to obtain brightness information (multi metering). The method for calculating the brightness information can be set by the user from the menu. In another manner, any calculating method may be determined preliminarily.

The controller 150 controls the Ev value to control the exposure so that a value (hereinafter, "brightness value") representing the acquired current brightness information becomes the target brightness value stored in the ROM. The value stored in the ROM is used as the target brightness value, but when the digital camera 100 has an exposure correcting function, the target brightness value can be corrected by the exposure correction function.

The controller 150 acquires the current Ev value (S202). The current Ev value is determined by the current Av value and Tv value. An initial Ev value just after the power is turned on, namely, at the time when the CCD image sensor 120 starts to generate the image data is set based on initial data relating to the aperture value and the shutter speed stored in the ROM.

The controller 150 determines a difference ΔY between the target brightness value and the current brightness value (S203), and determines the Ev correction amount from ΔY based on the relationship shown in FIG. 3 (S204). A corrected Ev value (the target Ev value or the target exposure value) is calculated based on the current Ev value and the Ev correction amount (S205).

The controller 150 refers to the diagram of FIG. 4, and determines the Av value and the Tv value, namely, the aperture value and the shutter speed for obtaining the corrected Ev value (target Tv value) (S206). Details of the methods for determining the Av value and the Tv value in the A mode and the S mode are described later.

In the P mode, the exposure is controlled according to the program line on the diagram. Concretely, the AV value and the Tv value are determined based on an intersection between a line of the corrected Tv value determined by the controller 150 and the program line. For example, when the current Ev value is 13, the Av value is 7 and the Tv value is 6 according to the program line. If the Ev correction amount calculated based on the difference ΔY between the target brightness value and the current brightness value is −2, the corrected Tv value (target Tv value) becomes 11 (=13-2). Therefore, it is understand that in order to obtain the corrected Ev value, the Av value may be corrected to 6, and the Tv value may be corrected to 5.

To determine the Av value and the Tv value with respect to the determined and corrected Ev value, the diagram for finding, from the Ev value, a combination of the aperture value and the shutter speed is referred to, and one can be selected from the combinations of parameters by which the target Ev value can be determine in a range of a shooting parameter which can be set in the digital camera 100. As the shooting parameter range which can be set in the digital camera 100, namely, the settable range of the shooting parameters, the aperture value is within a range of F4 to F22, and the shutter speed is within a range of 60 to 1/4000 seconds. That is, the Av value is within a range of 4 to 9, and the Tv value is within a range of −6 to 12. The information relating to the settable ranges is stored in the ROM, and the controller 150 suitably reads the information from the ROM to use it.

Figure 6:
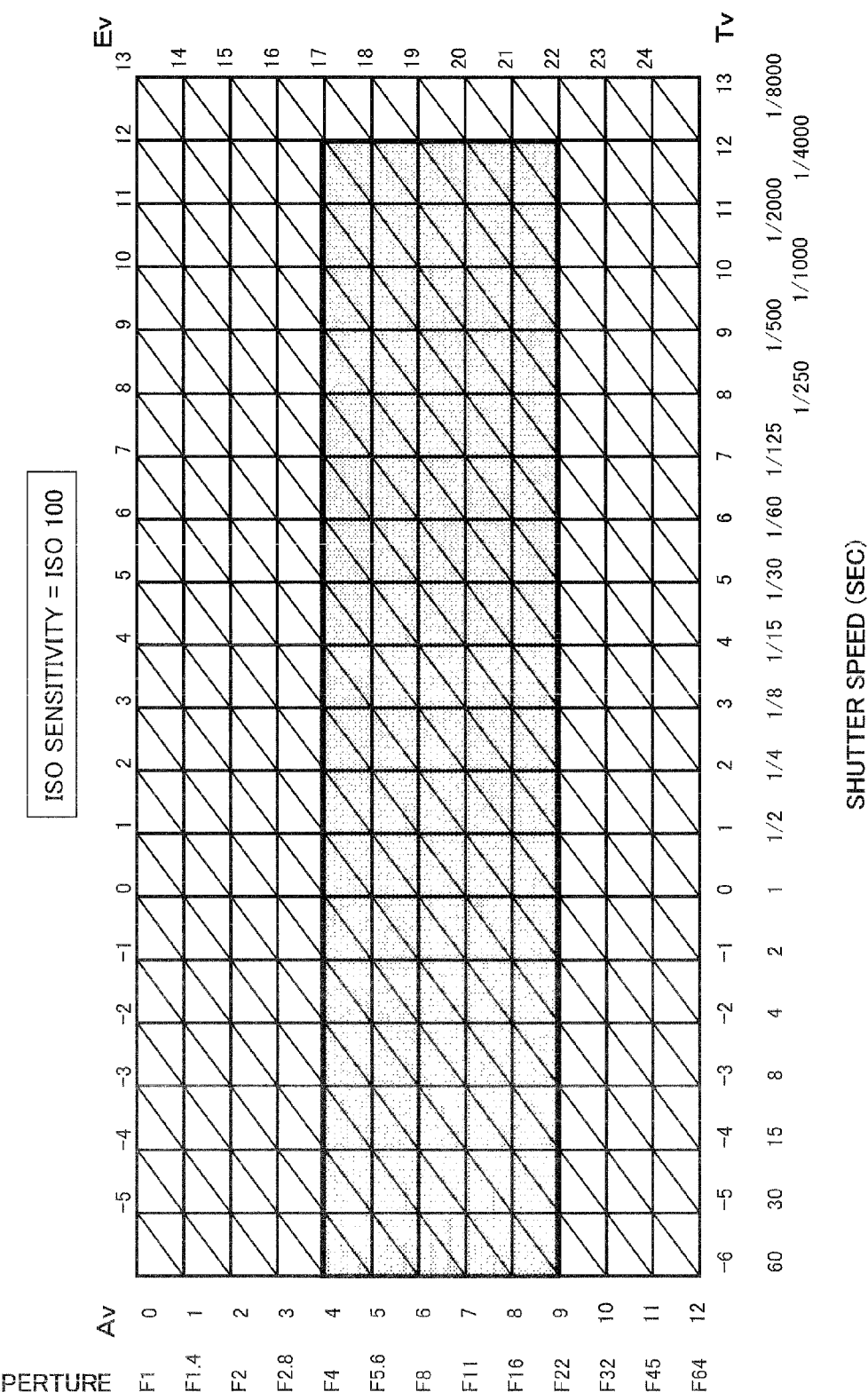
FIG. 6 is a diagram describing a settable range of shooting parameters of the digital camera.

FIG. 6 is a diagram illustrating the settable range (hereinafter, referred to as "camera settable range") of the shooting parameters of the digital camera 100 in the case where the ISO sensitivity is ISO100 as a shaded portion on the diagram. In FIG. 6, when the ISO sensitivity is ISO100 in the digital camera 100, the settable range of the aperture value is F4 to F22 (4 to 9 as the Av value), and the settable range of the shutter speed is 1/4000 to 60 seconds (12 to −6 as the Tv value). These settable ranges are determined depending on optical or mechanical performances of hardware elements composing the digital camera 100.

The controller 150 transmits signals for driving the diaphragm 113, the shutter 114 and the CCD image sensor 120 to the respective driver (not shown) according to the determined parameters. When the shooting parameters for obtaining the suitable exposure determined in the aforementioned manner are within the camera settable ranges, the operation according to the shooting parameters is performed every one-frame period and the exposure is set so that the brightness value of the image data becomes a target brightness value and the suitable exposure is obtained.

Methods for determining the Av value and the Tv value in the A mode and the S mode are described in detail below. Further, a method for determining the settable range of each shooting parameter on the display of the exposure guide is described.

2-2-2. Determination of Parameters of Tv Value or the Like in A Mode

At first, a method for determining the settable range of the Av value and the Tv value in the A mode (aperture priority AE mode) is described.

Figure 7:
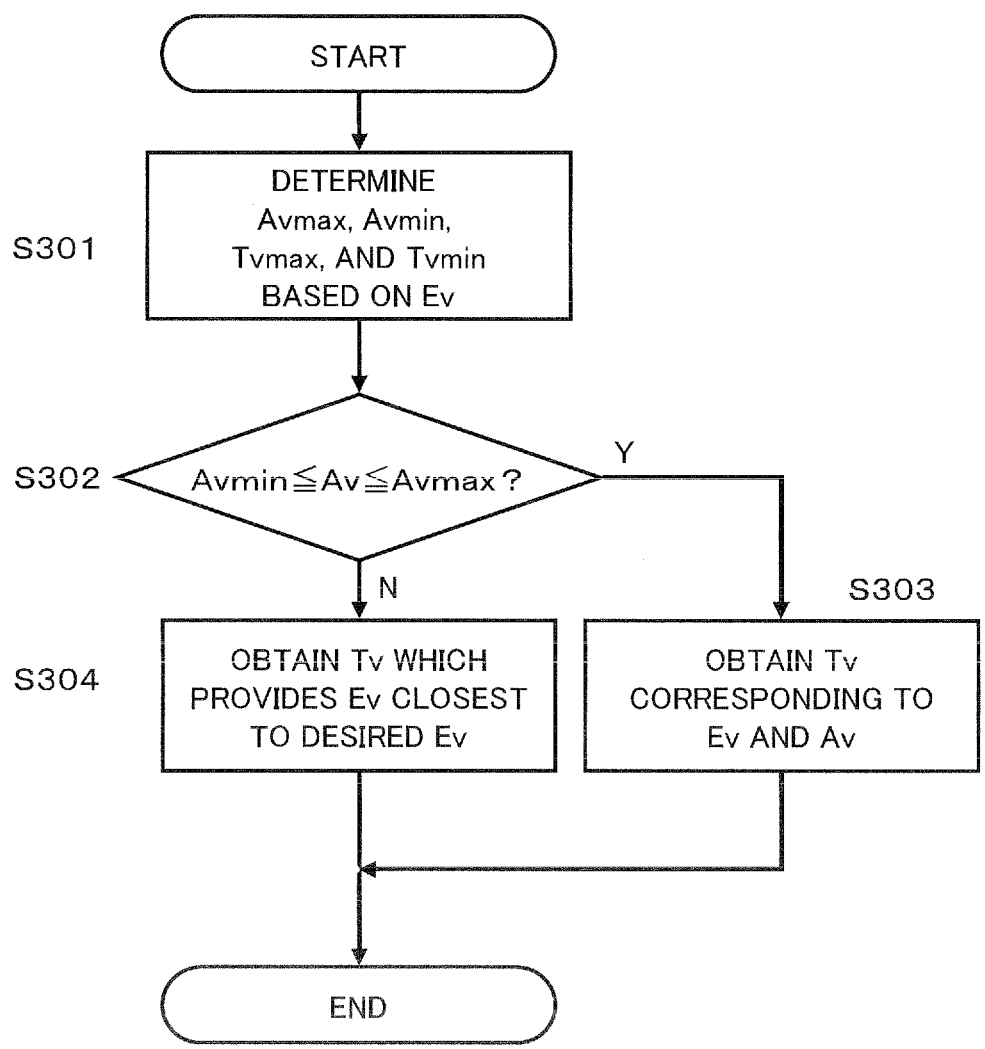
FIG. 7 is a flowchart of a process in A mode for determining a settable range of the Av value for obtaining a target Ev value and the Tv value corresponding to the Av value set by a user.

FIG. 7 is a flowchart illustrating a process for determining the settable range of the Av value for obtaining the target Ev value in the A mode and the Tv value corresponding to the set Av value. In the A mode, since the Av value is fixed to a value set by the user, the controller 150 determines the Tv value. The controller 150 determines also the settable range of the Av value in order to obtain the target Ev value, regardless of user's setting. The following describes the case where the target Ev value is 13 and the aperture value set by the user is F5.6 (the Av value is 5) as a concrete example.

The controller 150 determines the settable ranges of the Av value and the Tv value with respect to the target Iv value based on the diagram of FIG. 6 (S301). Since the settable ranges of the Av value and the Tv value are the shaded portion in FIG. 6, the ranges (upper limit value and lower limit value) of the Av value and the Tv value with which the target Ev value can be obtained may be determined in the shaded area. When the upper limit value of the Av value is determined as Avmax, the lower limit value as Avmin, the upper limit value of the Tv value is determined as Tvmax and the lower limit value as Tvmin, it is found from FIG. 6 that when the Ev value is 13, Avmin=4 (at this time, Tvmax=9) and Avmax=9 (at this time, Tvmin=4). It goes without saying that determining of the settable ranges of the Av value and the T value is equivalent to determining of the unsettable ranges of the Av value and the Tv value.

A determination is made whether or not the Av value corresponding to the aperture value currently set by the user is within the settable range, namely, within a range from Avmin to Avmax (S302). When the Av value is within this range ("Y" in S302), the Tv value corresponding to a combination of the target Ev value and the Av value set by the user is determined based on the diagram of FIG. 6 (S303), and the process is ended.

On the other hand, when the Av value corresponding to the aperture value currently set by the user is out of the settable range ("N" in S302), the Tv value which provides the Ev value closest to the target Ev value in the camera settable range with the Av value set by the user is determined (S304), and the process is ended.

In this example, Avmin=4, Avmax=9, the aperture value set by the user is 5 as the Av value, which is within the range. For this the controller 150 obtains 8 as the Tv value corresponding to a combination of the Ev value of 13 and the Av value of 5 based on the diagram.

In the above process, the settable range of the Av value (Avmax=9 and Avmin=4) and the Tv value (=8) corresponding to the set Av value for obtaining the target Ev value (=13) in the A mode are obtained.

2-2-3. Determination of Parameters of Av Value or the Like in S Mode

A method for determining the settable range of the Tv value and the Av value in the S mode (shutter speed priority AE mode) is described below.

Figure 8:
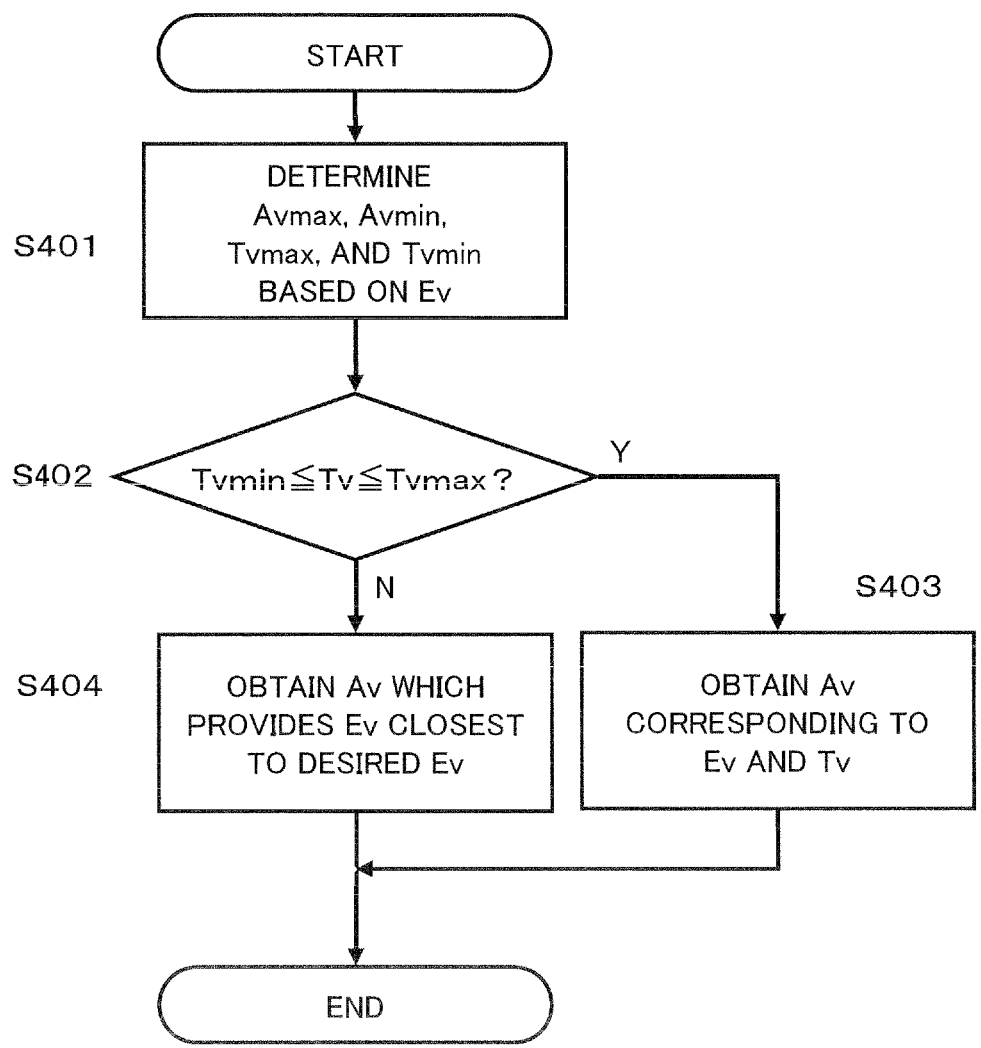
FIG. 8 is a flowchart of a process in S mode for determining a settable range of the Tv value for obtaining a target Ev value and the Av value corresponding to the Tv value set by a user

FIG. 8 is a flowchart illustrating the processes for determining the settable range of the TV value and the Av value corresponding to the set Tv value, for obtaining the target Ev value in the S mode. In the S mode, since the Tv value is fixed to the value set by the user, the controller 150 determines the Av value. Further, the controller 150 determines the settable range of the Tv value for obtaining the target Ev value, regardless of user's setting. The following describes the case where the target Ev value is 13 and the shutter speed set by the user is 1/2000 seconds (Tv value is 11) as a concrete example.

The controller 150 determines the settable ranges of the Av value and the Tv value (upper limit value and lower limit value) corresponding to the target Ev value based on the diagram of FIG. 6 (S401). When the upper limit value of the Av value is determined as Avmax, the lower limit value as Avmin, the upper limit value of the Tv value is determined as Tvmax and the lower limit value as Tvmin, it is found that when the Ev value is 13, Avmin=4 (at this time, Tvmax=9) and Avmax=9 (at this time, Tvmin=4).

A determination is made whether or not the Tv value corresponding to the shutter speed currently set by the user is within the settable range, namely, the range from Tvmin to Tvmax (S402). When the Tv value is within this range ("Y" in S402), the Av value corresponding to a combination of the target Ev value and the Tv value set by the user is determined based on the diagram of FIG. 6 (S403), and the process is ended.

On the other hand, when the Tv value corresponding to the shutter speed currently set by the user is out of the settable range ("N" in S402), the AV value which provides the Ev value closest to the target EV value in the camera settable range with the Tv value set by the user is determine (S404), and the process is ended. For example in this example, the settable range of the Tv value is 4 to 9, and the Tv value corresponding to the shutter speed set by the user is 11. Hence, the Tv value set by the user is out of the settable range.

Therefore, when the Tv value is 11, the controller 150 selects 4 as the Av value within the camera settable range with which the Ev value becomes the closest to 13 as the target Ev value based on the diagram of FIG. 6. The Ev value at this time becomes 15 and thus becomes larger than 13 as the target Ev value. This means that the suitable exposure cannot be obtained at the shutter speed set by the user, and the Ev value to be obtained becomes larger than the target Ev value, resulting in underexposure. It means overexposure that the Ev value to be obtained is smaller than the target Ev value.

With the above process, the settable range of the Tv value (Tvmax=9 and Tvmin=4) and the Av value (=4) corresponding to the set Tv value are determined in the S mode for obtaining the target Ev value (=13).

2-3. Display of Exposure Guide

When the Av value and the Tv value for obtaining the target Ev value are determined by the exposure control operation, the controller 150 generates an image that shows a current exposure state determined by these shooting parameters together with the settable range of the shooting parameters, and displays it as the exposure guide on the display section 170. The exposure guide is described below.

Figure 9:
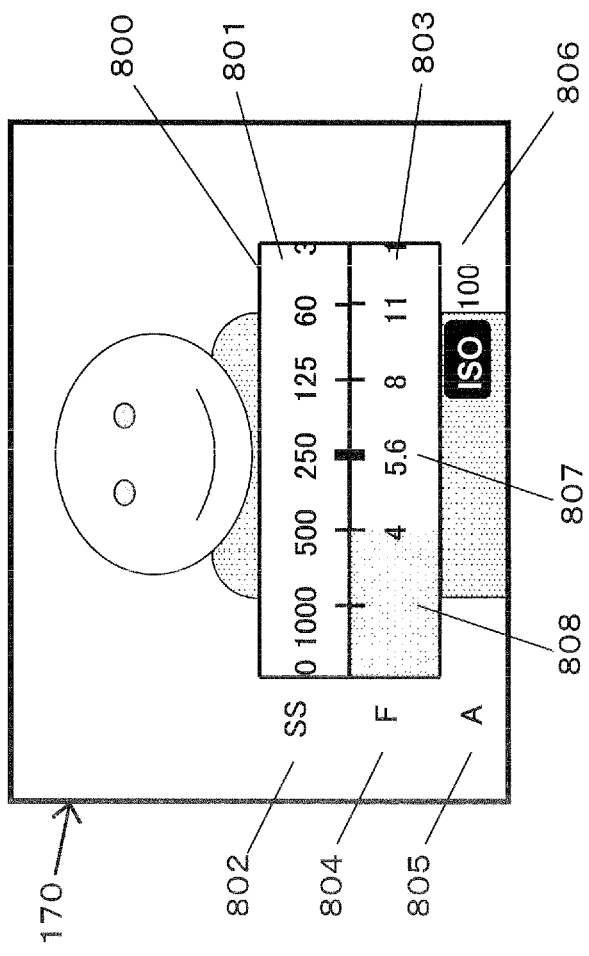
FIG. 9 is a diagram illustrating an example of the exposure guide.

FIG. 9 is a diagram illustrating a display example of the exposure guide. FIG. 9 shows an exposure guide 800 in the A mode as one example. The controller 150 generates a display image of the exposure guide 800 and superimposes it on the image data so as to display the resultant on the display section 170.

The exposure guide 800 includes a shutter speed display area 801 on an upper side and an aperture value display area 803 on a lower side. The shutter speed display area 801 includes a numerical line that extends in a horizontal direction, and the value of the shutter speed currently set is arranged at the center of the numerical line, and a plurality of settable values of the shutter speed are arranged before and after the center. The aperture value display area 803 includes a numerical line that extends in the horizontal direction, and the aperture value (F value) currently set is arranged at the center of the numerical line, and a plurality of settable the aperture values (F values) is arranged before and after the center.

The values of the shutter speed on the shutter speed display area 801 and the aperture values on the aperture value display area 803 are arranged to be adjacent up and down. A pair of the shutter speed and the aperture value arranged adjacently up and down is a combination for realizing the target exposure value.

In the respective display areas 801 and 803, the current set value and a predetermined range before and after the set value are displayed. The user can recognize that the shutter speed is 1/250 seconds and the aperture value (F value) is 5.6 as the current settings based on the exposure guide 800 shown in FIG. 9.

In this manner, the shutter speed displayed on the shutter speed display area 801 and the aperture value (F values) displayed on the aperture value display area 803 are arranged correspondingly up and down so as to form a combination of the shutter speed and the aperture values for obtaining a target exposure value. As a result, the user can instantaneously recognize the combination of the range of parameters for obtaining the suitable exposure in addition to a range (suitable exposure area) of parameters and the shooting parameter for providing the suitable exposure. Therefore, for example when the user wants to shallow the depth of field to make a picture in which a blur level of a background is increased, namely, when the aperture value is desired to be decreased, the user refers to the exposure guide 800 to easily and quickly recognize the suitable aperture value, and thus the user can make a quick response.

An icon 802 showing "SS" representing that the upper side is indication of the shutter speed is provided on the left of the shutter speed display area 801. Similarly, an icon 804 showing "F" representing that the lower side is indication of the aperture value is provided to the left of the aperture value display area 803.

In the A mode where the aperture value is set by the user, each aperture value is displayed in the aperture value display area 803 so as to be larger as it goes right (the diaphragm is narrowed). That is to say, the aperture value is displayed so that when only the aperture value is changed without changing the other shooting parameters, the exposure decreases towards the right. In the A mode, since the shutter speed value is displayed in relation with the value in the aperture value display area 803, the shutter speed value is displayed in the shutter speed display area 801 so as to be slower (the value becomes larger) as it goes right.

On the other hand, in the S mode where the shutter speed is set by the user, the set values of the aperture value and the shutter speed are displayed with the left-right reversal to the A mode. That is to say, in the S mode, the shutter speed is displayed in the shutter speed display area 801 so as to become faster (the value becomes smaller) as it goes right. That is to say, when only the shutter speed is changed without changing the other shooting parameters, the shutter speed value is displayed so that the exposure is reduced as the shutter speed goes right. In the S mode, since the aperture value is displayed in the aperture value display area 803 with being related with the value in the shutter speed display area 801, the aperture value is displayed so as to be smaller (the diaphragm is opened) as it goes right.

The reason why the set values of the aperture value and the shutter speed to be displayed are displayed in reverse arrangements between the A mode and the S mode is because convenience of the user's operation is taken into consideration. This is described below. The user selects the aperture value in the A mode, and selects the shutter speed in the S mode. In both modes, the arrangement of the parameters selected by user's operation is matched with the direction where the exposure is reduced (or increased), so user's operational feeling at the time of selecting numerical value can be uniform. For example, when the set value of the aperture value or the shutter speed can be changed by a rotating operation of a dial, the arrangement of the aperture value and the set value of the shutter speed is matched with the exposure change direction, so that the operating direction (rotating direction) of the dial matches with a direction (scroll direction) of changing the display of the set values. As a result, the user can easily perform a sensuous operation.

As long as the suitable exposure is obtained, the shutter speed display area 801 and the aperture value display area 803 can be moved (scrolled) to the same direction by the same amount according to a change in either one of values by the user.

A recording mode icon 805 representing a current recording mode is displayed on a lower left side of the exposure guide 800. In FIG. 9, "A" representing the A mode is displayed. An ISO sensitivity icon 806 representing a current ISO sensitivity is displayed on a lower right side of the exposure guide 800. The shutter speed ("250" indicates ½50 seconds) and the aperture value ("5.6" indicates F5.6) currently set are displayed on center portions 807 of the shutter speed display area 801 and the aperture value display area 803.

In the shutter speed display area 801 and the aperture value display area 803, an area out of the camera settable range (hereinafter, "unsettable area") 808 is colored (shaded by dots in FIG. 9) so that the area out of the camera settable range is discriminated from the camera settable range. For example, the unsettable area 808 is displayed with red. The unsettable area 808 is an area where set values of the aperture value or the shutter speed cannot be set. In other words, the unsettable area 808 is an area that includes values less than the lower limit value in the settable range of the aperture value or the shutter speed of the digital camera 100 or an area that includes values exceeding the upper limit value thereof.

FIGS. 10A and 10B are diagrams illustrating another display example of the exposure guide in the A mode. FIG. 9 illustrates the entire display image of the display section 170, but FIGS. 10A and 10B illustrate only the exposure guide and OSD display around the exposure guide.

As illustrated in the description of the exposure control operation, when the target Ev value is 13 and the aperture value set by the user is F5.6 (Av value is 5) in the A mode, the shutter speed is determined to ½50 seconds (Tv value is 8) by the controller 150. At this time, the settable range of the aperture value is F4 to F22 (Avmax=9 and Avmin=4). That is to say, the settable range of the aperture value is the whole camera settable range. FIG. 10A is a diagram illustrating the display state of the exposure guide 800 at this time. F5.6 as the aperture value set by the user and ½50 seconds as the shutter speed determined correspondingly are displayed alongside up and down in the center portion 807.

It is assumed that the user operates the operation section 180 so as to increase the aperture value, and finally changes it to F16 (AV value=8). As a result, the controller 150 sequentially determines shutter speeds corresponding to the user's operation according to the exposure control operation described above. The display of the aperture value display area 803 is scrolled left as the aperture value changes. In conjunction with this, the display of the shutter speed display area 801 is scrolled to left. As shown in FIG. 10B, the aperture value of 16 and the shutter speed of ⅟30 seconds (Tv value is 5) are displayed in the center portion 807 alongside up and down.

When the shutter speed becomes slow, a captured image is influenced by camera shake and thus a blur image might be obtained. Therefore, an area (hereinafter, "camera shake area") that might be influenced by camera shake may be displayed with color so that the user can easily recognize the area that might be influenced by camera shake. That is to say, the camera shake area 809 is colored so as to be discriminated from the unsettable area 808. In FIG. 10B, the camera shake area 809 is hatched by diagonal grating. In this example, the camera shake area 809 is determined in the following method. It is assumed that a focal distance of the optical system 110 is 30 mm in 35 mm film equivalent. The controller 150 acquires information about the focal distance from position information of the zoom lens 112. The controller 150 determines an area where the shutter speed is slower than an inverse of the focal distance as a camera shake area, and displays the camera shake area so as to discriminate this area from the other areas. Further, when the digital camera 100 has an optical camera shake correction lens (OIS), the camera shake area may be calculated based on the camera shake correction function.

FIGS. 11A to 11D are diagrams illustrating display examples of the exposure guide in the S mode. FIG. 9 illustrates the entire display image of the display section 170, but FIGS. 11A to 11D illustrate only the exposure guide and OSD display around the exposure guide.

As illustrated in the description of the exposure control operation, when the target Ev value is 13 and the shutter speed set by the user is 1/2000 seconds (Tv value is 11) in the S mode, the aperture value becomes 4 (Av value is 4). The settable range of the shutter speed is 1/15 to 1/500 seconds (Tvmax=9 and Tvmin=4). That is to say, the settable range of the shutter speed for obtaining the suitable exposure is a part of the camera settable range. FIG. 11A is a diagram illustrating a display state of the exposure guide at this time. The shutter speed of 1/2000 seconds set by the user and the aperture value of F4 determined correspondingly are displayed in the center portion 807 alongside up and down. Further, the area 810 (hereinafter, "unsuitable exposure area") out of the settable range of the shutter speed for obtaining the suitable exposure is displayed with color. The unsuitable exposure area 810 is displayed (colored, and so on) so that it can be discriminated from the unsuitable area 808 and the camera shake area 809. In FIGS. 11A to 11D, the unsuitable exposure area 810 is hatched by diagonal lines. The unsuitable exposure area 810 is the area of underexposure as described above.

The user views the display of the exposure guide 800 to recognize that a current shutter speed is unsuitable. The user can understand in one view that the unsuitable area of the shutter speed is an area where the shutter speed is faster than 1/500 seconds and may be set to 1/500 seconds or slower in order to obtain the suitable exposure based on the unsuitable exposure area 810 of the shutter speed in the exposure guide 800.

Thereafter, the user can operate the operation section 180 to sequentially slow the shutter speed. The controller 150 sequentially determines the aperture value corresponding to user's operation according to the exposure control operation described above. The shutter speed display area 801 is scrolled left according to the change in the shutter speed. However, while the shutter speed is in the unsuitable exposure area 810, namely, the area faster than 1/500 seconds, F4 that is the lower limit is selected as the aperture value. For this reason, the aperture value display area 803 is not scrolled and gets still. When the shutter speed is set to 1/500 seconds, it is known that the aperture value is still F4 but it enters the range where the suitable exposure is obtained. FIG. 11B is a diagram illustrating a display state of the exposure guide when the shutter speed is set to 1/500 seconds by the user and the aperture value is automatically set to F4.

When the user further slows the shutter speed to 1/250 seconds, the shutter speed of 1/250 seconds is within the suitable exposure range, and thus accordingly the aperture value becomes F5.6. FIG. 11C is a diagram illustrating a display state of the exposure guide at this time.

Further, when the user slows the shutter speed to 1/30 seconds, the 1/30 seconds as the shutter speed is within the suitable exposure range, and thus accordingly the aperture value becomes F16. FIG. 11D is a diagram illustrating a display state of the exposure guide at this time. In the drawing, an area where the shutter speed is slower than 1/30 seconds is displayed as the camera shake area 809, and an area where the shutter speed is slower than 1/15 seconds is displayed as the unsuitable exposure area 810b. The unsuitable exposure area 810b is an overexposure area. The unsuitable exposure area 810b may be displayed with color similarly to the unsuitable exposure area 810 (underexposure) in FIG. 11A, or may be displayed with color to be discriminated from the unsuitable area 810.

3. CONCLUSION

The digital camera 100 according to the embodiment includes the CCD 120 that captures a subject image to generate image data, the controller 150 that calculates a target exposure value based on the image data, and controls the exposure to obtain the target Ev value based on the first shooting parameter (for example, one of the aperture value and the shutter speed) set by the user, and the display section 170. The controller 150 calculates a first suitable range which is a range of the first shooting parameter for obtaining the target Ev value, and calculates a second shooting parameter (for example, the other of the aperture value and the shutter speed) based on the target Ev value and the first shooting parameter set by the user. The display section 170 displays the exposure guide 800 including the first shooting parameter set by the user, the information representing the first suitable range and the calculated second shooting parameter.

With the above configuration, the set states of the shooting parameter for determining the exposure represented by the aperture value and the shutter speed are displayed on the display section 170 together with the parameter ranges for obtaining the suitable exposure. As a result, even when the user sets a parameter that does not provide the suitable exposure, the user can understand the value for obtaining the suitable exposure in one view, and can quickly set the suitable exposure based on that information.

II. Other Embodiments

In the digital camera 100 according to the first embodiment, the current exposure states determined by the shooting parameters are displayed as the exposure guide 800 together with the range of settable shooting parameter on the display section 170. However the exposure guide 800 may include another information. For example, an indicator representing a blur level of an image according to the aperture value may be displayed. The indicator representing the blur level can be calculated based on the focal distance, a shooting distance (distance to a subject) and the aperture value of the digital camera 100.

The first embodiment does not particularly describe exposure correction, but the digital camera 100 may have an exposure correction function. According to the exposure correction function, when the user operates the operation section 180 to set an exposure corrected value, a target brightness value is corrected according to the set value. Concretely, when the exposure corrected value is set to a positive value (namely, when the exposure corrected value is set so that image data finally obtained becomes more bright), the target brightness value is corrected to a higher value according to an absolute value of the set value. On the contrary, when the exposure corrected value is set to a negative value (namely, the exposure corrected value is set so that an image data finally obtained becomes dark), the target brightness value is corrected to a lower value according to an absolute value of the set value. The other operations are similar to those in the first embodiment.

In the digital camera 100 according to the first embodiment, the ISO sensitivity is fixed to a value set by the user, but the ISO sensitivity may be controlled in the exposure control. For example, when the ISO sensitivity is increased by one step so that the target Ev value can be increased by 1. Therefore, when the current Ev value is 13 and the target Ev value is 12 and the ISO sensitivity is 100, for example, the Av value and the Tv value are not changed and the ISO sensitivity is increased to 200 by one step. As a result, the target Ev value becomes 13 so that the suitable exposure can be obtained.

In the first embodiment, the exposure guide 800 shows the aperture value and the shutter speed as the two parameters that are arranged up and down, but another parameter may be arranged. For example, the ISO sensitivity may be related with the aperture value and the shutter speed and be displayed.

In the first embodiment, the set value (shutter speed or aperture value) as the single parameter to be operated is arranged on the exposure guide 800 so that the exposure is further decreased as the parameter goes right, but the set value may be arranged so that the exposure is increased as the parameter goes right. Further, the arrangement order of the set values may be the same between the A mode and the S mode.

In the first embodiment, the display image of the exposure guide 800 is generated and is superimposed on the image data so as to be displayed on the display section 170. However, another display section for the exposure guide may be provided separately from the display section for displaying the image data.

In the first embodiment, the settable range of the aperture value is F4 to F22, and the settable range of the shutter speed is 60 to 1/4000 seconds. However, this is one example, and the settable range is not limited to this and any settable range may be set.

In the first embodiment, the corresponding set values (the shutter speed and the aperture value) are arranged adjacently up and down on the shutter speed display area 801 and the aperture value display area 803. Current set values are arranged on the center portions of the respective display areas 801 and 803, and predetermined ranges before and after the set values are displayed. However, the display manner of the set values on the display areas 801 and 803 is not limited to this. Any display state can be adopted as long as the shooting parameter (the aperture value in the A mode, or the shutter speed in the S mode) set by the user in the current mode (the A mode or the S mode) is displayed together with a range of values for obtaining the target exposure value. For example in the S mode, when the range of the shutter speed for obtaining the suitable exposure and the shutter speed currently set by the user are displayed, the effect similar to that in the first embodiment can be obtained. However, the shooting parameters which are automatically set by the controller 150 may be also displayed, so that the user can easily estimate how image data changes with the parameters, which is desirable. For example, the aperture value calculated by the controller 150 may be also displayed, so that the user can estimate a blur level of image data to be obtained, and this is desirable.

In the digital camera 100 according to the first embodiment, the shooting parameter set by the user in the A mode or the S mode (the aperture value in the A mode, or the shutter speed in the S mode) is displayed together with the value range for obtaining the target exposure value. However, the recording mode is not limited to the A mode or the S mode, and a current set value in any recording mode may be displayed together with the value range for obtaining the target exposure value. For example, when the recording mode is the M mode, the current set value(s) as to the aperture value and/or the shutter speed may be displayed together with the value range for obtaining the target exposure value.

The first embodiment describes the digital camera where the lens is incorporated integrally with the camera body, but similarly the idea of the first embodiment can be applied also to an interchangeable lens-type digital camera in which a lens is mountable to a camera body. In a case of the interchangeable lens-type digital camera, the information of the settable range of the shooting parameter can be obtained from the interchangeable lens (ROM in the interchangeable lens).

In the exposure guide 800, a background of the shooting parameter set by the user may be opaque. As a result, the value of the shooting parameter is easily discriminated from a background image so that visibility of the value of the shooting parameter can be improved. A background of parameters other than parameters set by the user may be semitransparent, so that visibility of the value of the shooting parameter currently set by the user can be improved and further visibility of the through image can be improved.

INDUSTRIAL APPLICABILITY

The aforementioned embodiments can display a guide that enables a user to easily recognize parameters such as an aperture value and a shutter speed for providing suitable exposure. Hence, the user can recognize a parameter range for obtaining the suitable exposure in one view, and can quickly set the suitable exposure. Therefore, the embodiments are useful for imaging apparatuses such as a digital camera and a camcorder having a function for setting the exposure by the user.

What is claimed is:

1. An imaging apparatus comprising:
   an imaging unit operable to capture a subject image to generate image data;
   a controller operable to calculate a target exposure value based on the image data and control exposure based on a first shooting parameter set by a user to obtain the target exposure value; and
   a display unit operable to provide a display,
   wherein the controller calculates a first suitable range which is a range of the first shooting parameter for obtaining the target exposure value, and calculates a second shooting parameter based on the target exposure value and the first shooting parameter set by the user, and
   the display unit displays exposure guide information including the first shooting parameter set by the user, information representing the first suitable range, and the calculated second shooting parameter.

2. The imaging apparatus according to claim 1, wherein the controller determines a first unsuitable range which is a range of the first shooting parameter where the target exposure value is not obtained, and
   the exposure guide information further includes information representing the first unsuitable range, and the information representing the first unsuitable range is displayed to be discriminated from the information representing the first suitable range.

3. The imaging apparatus according to claim 1, wherein the controller determines an unsettable range of the first shooting parameter,
   the exposure guide information includes information representing the unsettable range of the first shooting parameter, and the information representing the unsettable range of the first shooting parameter is displayed to be discriminated from the information representing the first suitable range.

4. The imaging apparatus according to claim 1, wherein the controller determines an unsettable range of the second shooting parameter, and
   the exposure guide information includes information representing the unsettable range of the second shooting parameter.

5. The imaging apparatus according to claim 1, wherein the controller calculates a camera shake range which is a range of the first shooting parameter where camera shake possibly occurs,
   the exposure guide information further includes information representing the camera shake range, and the information representing the camera shake range is displayed to be discriminated from the first suitable range.

6. The imaging apparatus according to claim 5, wherein the controller calculates the camera shake range based on a focal distance of an optical system for forming the subject image.

7. The imaging apparatus according to claim 1, wherein the exposure guide information includes a first numerical line on which the value of the first shooting parameter set by the user is shown together with values before and after the first shooting parameter, and a second numerical line on which the value of the second shooting parameter is shown.

8. The imaging apparatus according to claim 7, wherein the first numerical line and the second numerical line are arranged adjacently so that a pair of the value of the first shooting parameter and the value of the second shooting parameter for providing the target exposure value is displayed adjacently.

9. The imaging apparatus according to claim 1, wherein backgrounds of the first shooting parameter and the first suitable range in the exposure guide information to be displayed by the display unit are opaque.

10. The imaging apparatus according to claim 1, wherein one kind of set value can be selectively set, as the first shooting parameter, from plural kinds of set values relating to the exposure, the first shooting parameter set by the user and a plurality of first shooting parameters included in the first suitable range are arranged one-dimensionally, and the first shooting parameters are arranged so that the exposure given by the respective first shooting parameters decreases as the first shooting parameter goes in a predetermined direction regardless of the kinds of the set values.

11. The imaging apparatus according to claim 1, wherein the first shooting parameter is either one of an aperture value and a shutter speed, and the second shooting parameter is the other of the aperture value and the shutter speed.

* * * * *